United States Patent
Itoh et al.

(10) Patent No.: US 7,080,568 B2
(45) Date of Patent: Jul. 25, 2006

(54) SELECT CONTROL SYSTEM FOR A VEHICLE TRANSMISSION

(75) Inventors: Yoshiki Itoh, Okazaki (JP); Hideyuki Yamada, Nagoya (JP); Takeshige Miyazaki, Anjyo (JP); Mitsutoshi Kamiya, Kariya (JP); Yoshihiro Ichikawa, Gifu (JP); Tatuhiro Miyake, Kariya (JP)

(73) Assignee: Aisin Ai Co., Ltd., Nishio (JP)

( * ) Notice: Subject to any disclaimer, the term of this patent is extended or adjusted under 35 U.S.C. 154(b) by 89 days.

(21) Appl. No.: 10/781,663

(22) Filed: Feb. 20, 2004

(65) Prior Publication Data

US 2005/0107211 A1   May 19, 2005

(30) Foreign Application Priority Data

Feb. 20, 2003   (JP) .............................. 2003-043014

(51) Int. Cl.
*F16H 59/00* (2006.01)
*G06F 17/00* (2006.01)
(52) U.S. Cl. .......................................... 74/335; 701/66
(58) Field of Classification Search ................. 74/335; 477/115, 122–3, 902, 905; 701/64, 66
See application file for complete search history.

(56) References Cited

U.S. PATENT DOCUMENTS

| 2,931,237 | A | * | 4/1960 | Backus ......................... 74/335 |
| 4,621,328 | A | * | 11/1986 | Arai et al. ..................... 74/335 |
| 4,796,485 | A | * | 1/1989 | Ebina ........................... 74/335 |
| 6,434,468 | B1 | * | 8/2002 | Yu ............................... 701/55 |
| 6,520,039 | B1 | * | 2/2003 | Ogami et al. .................. 74/335 |

\* cited by examiner

*Primary Examiner*—Roger Pang
(74) *Attorney, Agent, or Firm*—Oblon, Spivak, McClelland, Maier & Neustadt, P.C.

(57) ABSTRACT

A select control system for a vehicle transmission includes a gate mechanism having plural gates respectively selected upon a shift operation and having at least an actual gate, a temporary target gate, and a target gate, a select position determining mechanism adjusted to move the actual gate to the target gate along a select direction of the gate mechanism, and a select control element adjusted to control the select position determining mechanism. The select control element performs a temporary target gate remaining process in which the actual gate temporarily remains at the temporary target gate and moves to the target gate.

17 Claims, 9 Drawing Sheets

Map under a fuel consumption mode

Basic map

SELECT CONTROL SYSTEM FOR A VEHICLE TRANSMISSION

CROSS REFERENCE TO RELATED APPLICATIONS

This application is based on and claims priority under 35 U.S.C. § 119 with respect to Japanese Patent Application 2003-043014, filed on Feb. 20, 2003, the entire content of which is incorporated herein by reference.

FIELD OF THE INVENTION

This invention generally relates to a select control system for a vehicle transmission with plural shift gates defining respective shift positions corresponding to respective shift stages.

BACKGROUND

A conventional control device for a transmission is disclosed in Japanese Patent Laid-Open Publication No. 2002-147590. The control device for the transmission includes a shift operation mechanism for performing a shift operation in the transmission, a select actuator for moving the shift operation mechanism in a selecting direction, a shift actuator for moving the shift operation mechanism in a shift direction, a target gear position instruction means for instructing a target gear position of the transmission, and a controller for controlling the select and shift actuators based upon a shift instruction from the target gear position instruction means.

In the above-described control device for the transmission, the select and shift actuators are controlled based upon the shift instruction from the target gear position instruction means. Therefore, the shift operation can be automated.

A need exists for providing improved control of the shift operation.

SUMMARY OF THE INVENTION

According to an aspect of the present invention, a select control system for a vehicle transmission includes a gate mechanism having plural gates, the respective plural gates being selected upon a shift operation, a select position determining mechanism adapted to move along a select direction of the gate mechanism, and select control means for controlling movement of the select position determining mechanism during a shift operation by performing a temporary target gate remaining process in which an actual gate temporarily remains at a temporary target gate and moves to a target gate. It is preferable that the temporary target gate is between the actual gate and the target gate, wherein at least one gate is skipped while the actual gate is moved to the target gate.

According to another aspect of the present invention, a method of performing a shift operation for a vehicle includes the steps of determining a temporary target gate, determining a temporary target gate remaining time, judging whether an actual gate is at the temporary target gate, counting the temporary target gate remaining time when the actual gate is judged to be at the temporary target gate, judging whether the temporary target gate remaining time is more than a predetermined period of time, judging that a corresponding condition between the temporary target gate and the target gate has been satisfied when the temporary target gate remaining time is judged to be more than the predetermined period of time, completing a select operation, and performing a shift operation when the corresponding condition has been satisfied.

According to a further aspect of the present invention, a select control system for a vehicle transmission in a vehicle having a driving power source and a transmitting path for transmitting a driving power from the vehicle driving power source includes a gate mechanism having plural gates for defining vehicle shift stages, means for determining a select position to be established in the transmission, means for operating the means for determining the select position and controlling means for controlling the means for operating the means for determining the select position such that an actual gate temporarily remains at a temporary target gate between the actual gate and a target gate before the actual gate reaches the target gate.

BRIEF DESCRIPTION OF THE DRAWING FIGURES

The foregoing and additional features and characteristics of the present invention will become more apparent from the following detailed description considered with reference to the accompanying drawing figures, wherein.

DETAILED DESCRIPTION OF THE PREFERRED EMBODIMENTS

Figure 1:
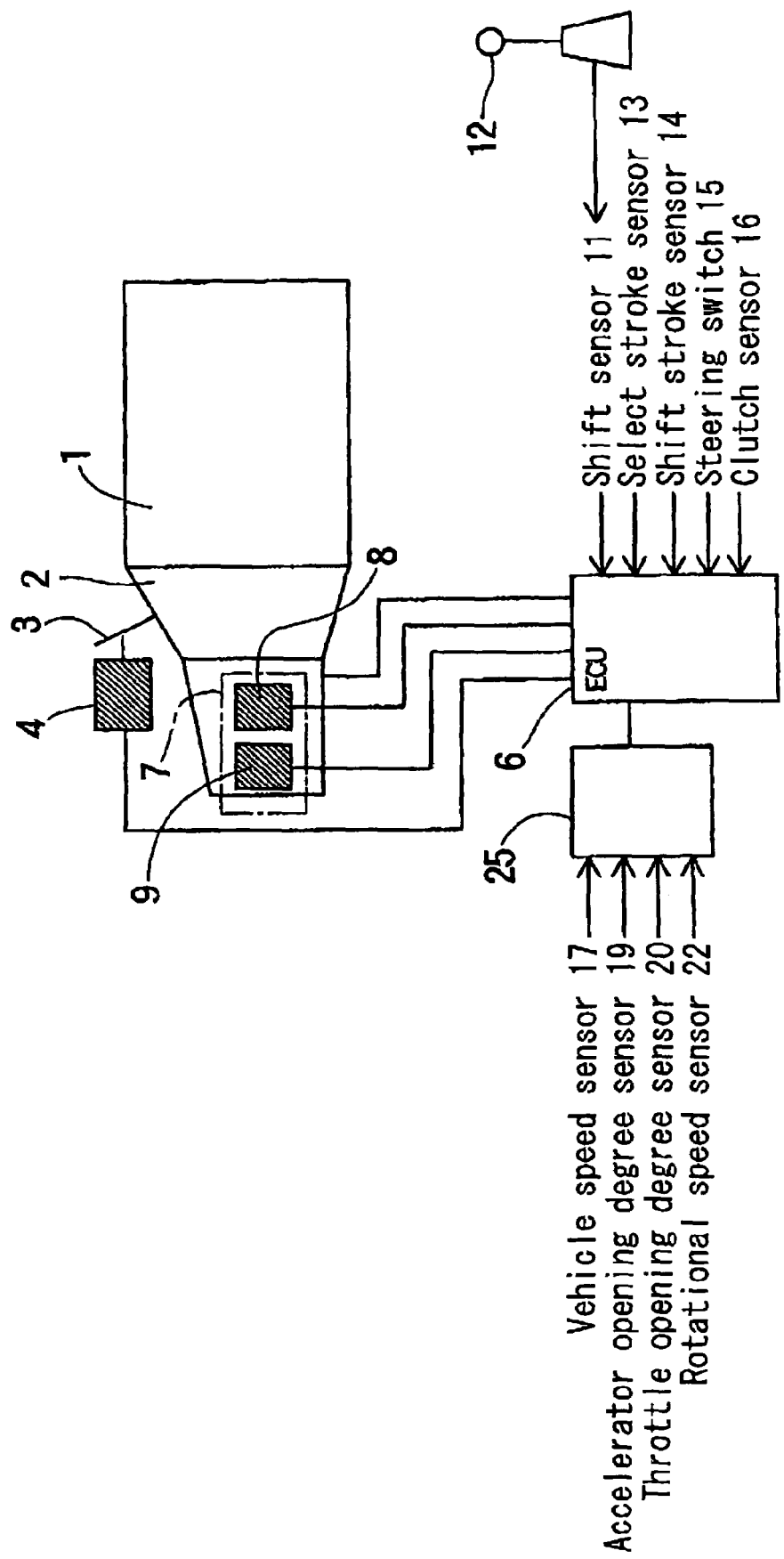
FIG. 1 is a block view schematically illustrating a control system for a transmission according to a first embodiment of the present invention.

As illustrated in FIG. 1, a control system for a transmission according to a first embodiment of the present invention includes a vehicle driving power source 1, e.g., an internal combustion engine or an electric motor, a vehicle transmission 2, a clutch 3, a clutch actuator 4 for operating the clutch 3, an electronic control unit (hereinafter, referred to as an ECU or controlling means) 6 having a central processing unit (hereinafter, referred to as CPU) and a memory, a select actuator 8 (i.e., means for operating the means for determining the select position), and a shift actuator 9. The transmission 2 transmits driving power from the driving power source 1 to a driving axle. The transmission 2 according to the first embodiment can be a known manual transmission in which the shift operation is automatically performed. The clutch 3 is operated by the clutch actuator 4 for establishing or interrupting a power transmitting path from the driving power source 1 to the transmission 2. The select actuator 8 is activated for performing a select operation of a select position determining mechanism 7 (i.e., means for determining a select position to be established in the transmission). The shift actuator 9 is activated for performing a shifting operation of the select position determining mechanism 7.

The control system for the transmission 2 further includes a shift sensor 11, a select stroke sensor 13, a shift stroke sensor 14, a steering switch 15, a clutch sensor 16, a vehicle speed sensor 17, an accelerator opening degree sensor 19, a throttle opening degree sensor 20, and a rotational speed sensor 22. The shift sensor 11 detects a shift stage instructed by a shift lever 12 manually operated by a user. The select stroke sensor 13 detects a stroke or a position of the select position determining mechanism 7 in a select direction. The shift stroke sensor 14 detects a stroke or a position of the select position determining mechanism 7 in a shift direction. The steering switch 15 is mounted near a driver's seat to be operated upon the shift operation. The clutch sensor 16 detects a position of the clutch 3 or a load of the clutch 3. The vehicle speed sensor 17 detects a physical amount related to a vehicle speed. The accelerator opening degree sensor 19 detects a physical amount related to an accelerator opening degree, i.e., an accelerator opening degree of an accelerating element such as an accelerator pedal operated by the driver. The throttle opening degree sensor 20 detects a throttle opening degree. The rotational speed sensor 22 detects a physical amount related to a rotational speed of a rotational shaft of the vehicle driving power source 1 such as a crankshaft of the internal combustion engine. A clutch pedal to be operated by the user is not necessarily provided, and yet can be provided near the driver's seat.

Each signal outputted from the shift sensor 11, the select stroke sensor 13, the shift stroke sensor 14, the steering switch 15, and the clutch sensor 16 is inputted to the ECU 6. Each signal outputted from the vehicle speed sensor 17, the accelerator opening degree sensor 19, the throttle opening degree sensor 20, and the rotational speed sensor 22 is first inputted to an engine electronic control unit (hereinafter, referred to as an engine ECU) 25, and is then inputted to the ECU 6. The ECU 6 outputs a control signal for controlling each of the select actuator 8, the shift actuator 9, and the clutch actuator 4 based upon the above-described signals. Therefore, the control system for the transmission 2 can be automatically operated. Further, the shift operation can be also automatically performed. The select actuator 8, the shift actuator 9, and the clutch actuator 4 can be an electric type motor, a hydraulic pressure type motor, and an air pressure type motor, as non-limiting examples.

Figure 2:
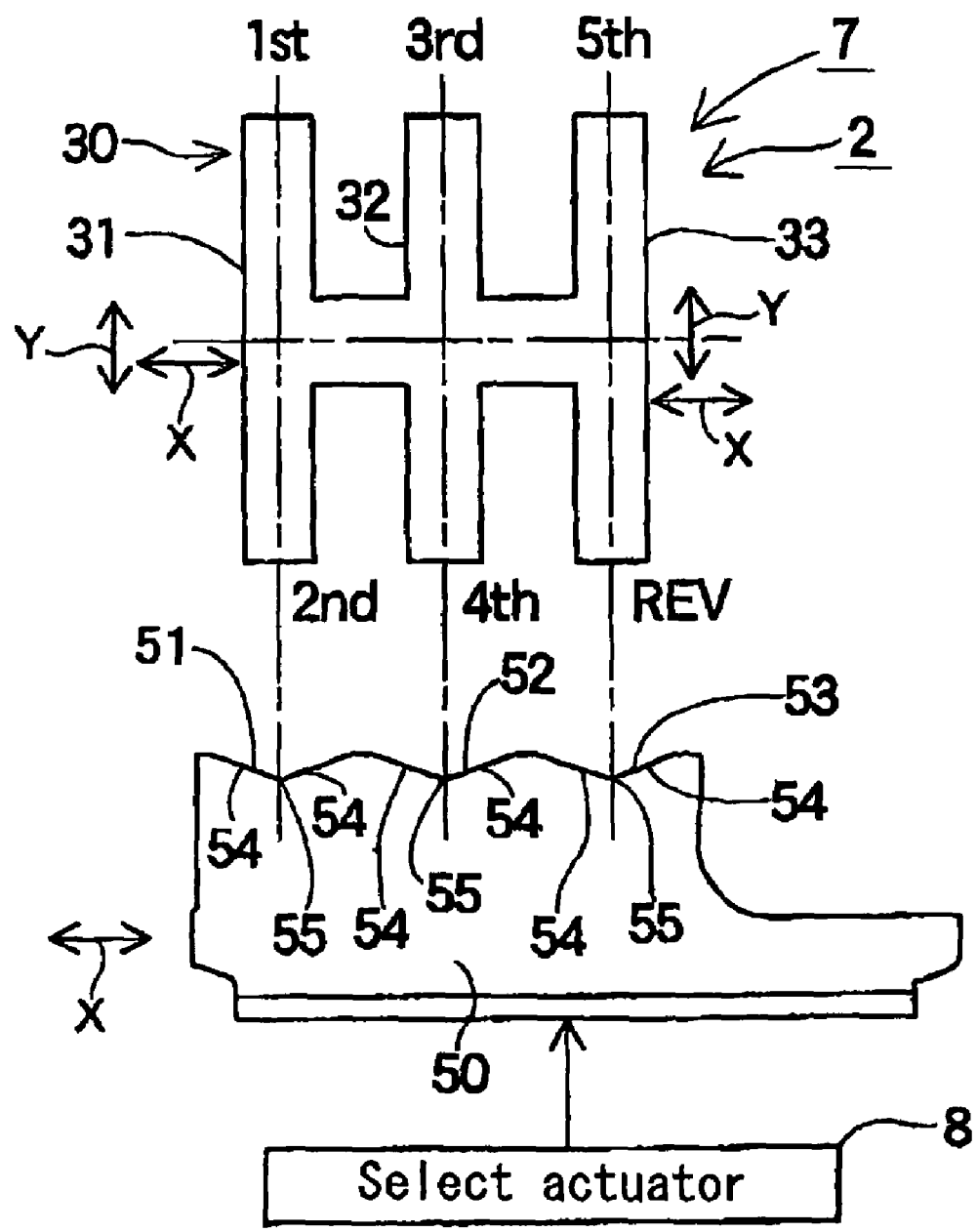
FIG. 2 is a schematic view illustrating a gate mechanism and a portion of a select position determining mechanism according to the first embodiment of the present invention.

FIG. 2 illustrates a gate mechanism 30 related to the select position determining mechanism 7. The gate mechanism 30 has plural gates arranged in the select direction. Each gate includes two shift positions for defining vehicle shift stages, respectively. More particularly, as illustrated in FIG. 2, the gate mechanism 30 according to the embodiment of the present invention is a three-gate type. The gate mechanism 30 includes a first gate 31, a second gate 32, and a third gate 33, all of which are arranged in parallel along the select direction. The first gate 31 defines a first shift stage and a second shift stage. The second gate 32 defines a third shift stage and a fourth shift stage. The third gate 33 defines a fifth shift stage and a reverse shift stage. In FIG. 2, the select direction is denoted with an arrow X, and the shift direction is denoted with an arrow Y. According to the embodiment of the present invention, the gate mechanism 30 is the aforementioned tree-gate type. However, the gate mechanism 30 is not limited the above-description and can be a different type.

Figure 3:
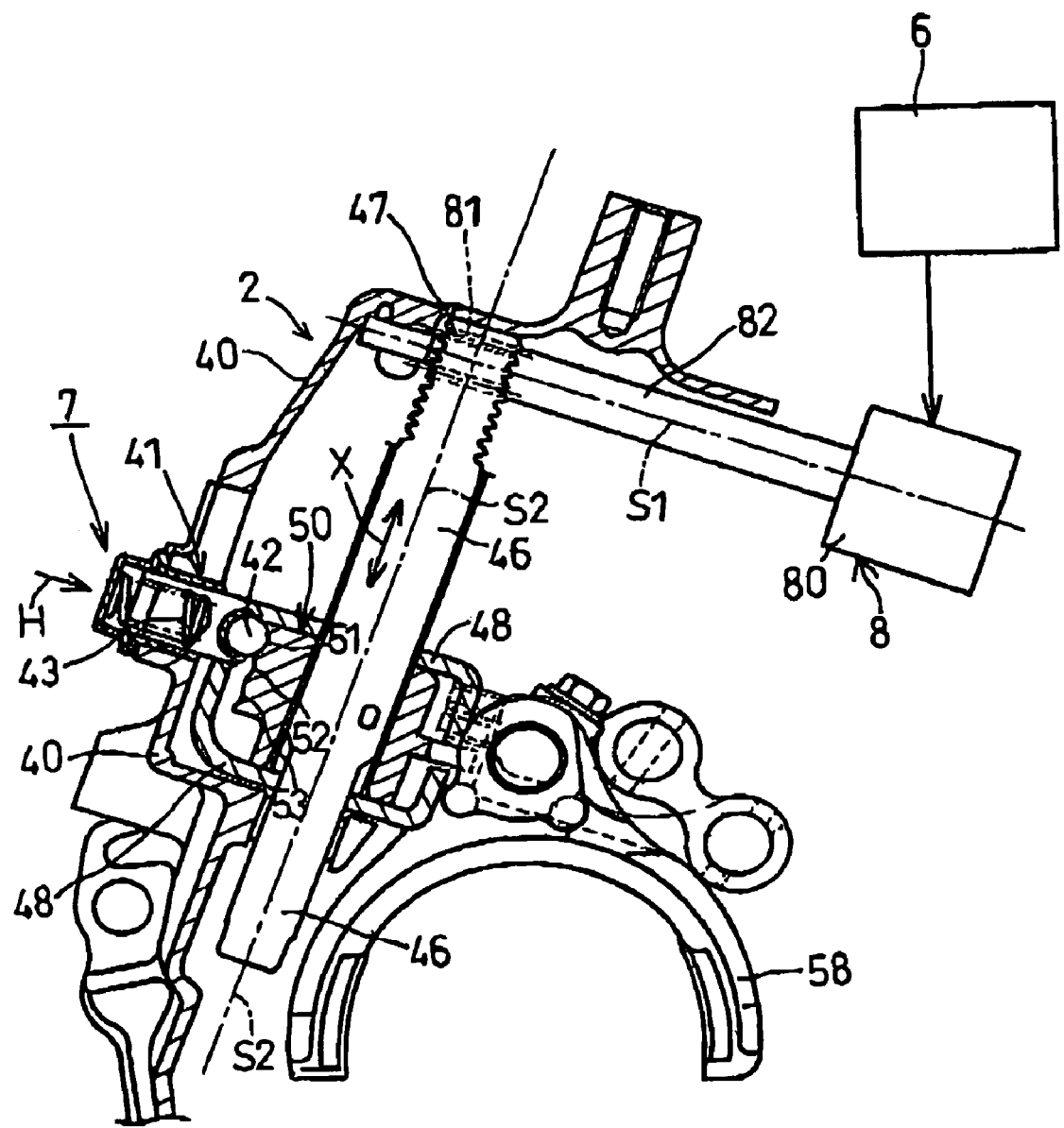
FIG. 3 is a view illustrating the select position determining mechanism in more detail.

As illustrated in FIG. 3, the select position determining mechanism 7 is supported by a housing 40 that is a portion of the transmission 2. The select position determining mechanism 7 includes an approximately convex base portion 41 supported by the housing 40, an engaged portion 50 movable to be engaged with or disengaged from the base portion 41, a shift and select shaft 46, i.e., a select intermediate member, adjusted to support the engaged portion 50 via a jig 48, and the select actuator 8 for moving the shift and select shaft 46 in a longitudinal direction thereof, i.e., in the select direction which is denoted with the arrow X.

As illustrated in FIG. 3, the base portion 41 includes a lock ball 42 configured as an engaging portion, and a biasing spring 43 (i.e., a biasing element) configured to bias the lock ball 42 in a locking direction denoted with an arrow H. In the meantime, the engaged portion 50 includes a first groove 51, which is approximately concave-shaped and corresponds to the first gate 31, a second groove 52, which is also approximately concave-shaped and corresponds to the second gate 32, and a third groove 53, which is also approximately concave-shaped and corresponds to the third gate 33. Turning back to FIG. 2, each of the grooves 51, 52, and 53 has an engaged surface 54 having a V shape in a cross section, and a deepest portion 55 that enhances an engaging force with the lock ball 42. FIG. 3 further illustrates a shift fork 58. When the select position determining mechanism 7 is moved in the shift direction, on the other hand, the shift and select shaft 46 is rotated about an axis S2 by the shift actuator 9.

The select actuator 8 includes an electric motor 80 driven by the ECU 6, and a rotational shaft 82 rotated about an axis S1 and having a pinion gear 81. The shift and select shaft 46 is provided with a rack portion 47. When the electric motor 80 is driven for rotation, the pinion gear 81 of the rotational shaft 82 is rotated. Therefore, the shift and select shaft 46 is moved back and forth in the select direction, i.e., in the direction denoted with the arrow X via the rack portion 47 in response to the rotation of the pinion gear 81. In this case, the engaged portion 50, which moves in the select direction X together with the shift and select shaft 46, is moved in the select direction relative to the lock ball 42.

Figure 4A:
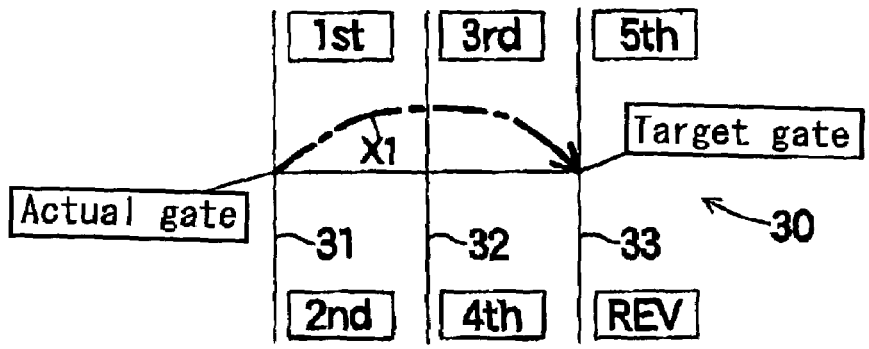
FIG. 4(A) illustrates a three-gate type gate mechanism in which a conventional select operation is performed.
Figure 4B:
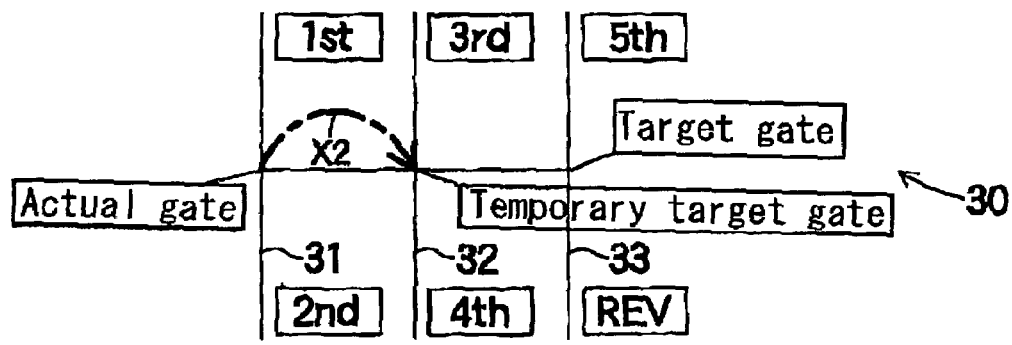
FIG. 4(B) illustrates a three-gate type gate mechanism in which a first example of select operations according to the first embodiment of the present invention is performed.

When an actual selected gate is changed from the first gate 31 directly to the third gate 33 as a target gate as illustrated in FIG. 4(A), the actual gate is shifted too suddenly. Therefore, this type of selection operation may cause some defects such as overshooting. The term "actual gate" hereinafter indicates a gate at which the shift position is currently located. The term "target gate" hereinafter indicates a gate at which the shift position is intended to be located. In order to avoid these types of defects, according to the embodiment of the present invention, the selection operation from the first gate 31 to the third gate 33 can be effectively performed in a different manner. As illustrated in FIGS. 4(B) and 4 (C), according to the embodiment of the present invention, the actual gate is the first gate 31, a temporary target gate is the second gate 32, and the target gate is the third gate 33. The term "temporary target gate" hereinafter indicates a gate at which the shift position is temporarily seated. That is, the temporary target gate can be an adjacent gate to the actual gate in the select direction. In other words, the temporary target gate can be between the actual gate and the target gate and at a near side of the gate mechanism 30.

Figure 4C:
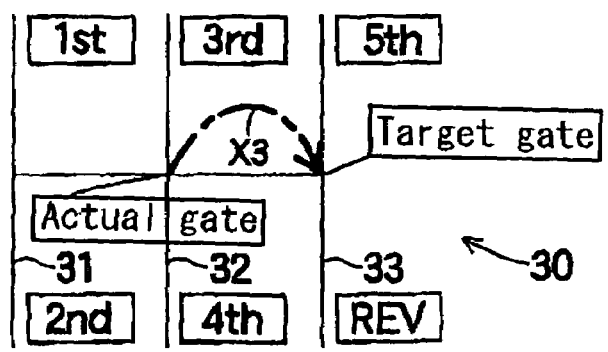
FIG. 4(C) illustrates a three-gate type gate mechanism in which a second example of the select operations according to the first embodiment of the present invention is performed.

As illustrated in FIG. 4(B), in response to the activation of the select actuator 8, the actual gate is moved in the select direction, i.e., in a direction denoted with an arrow X2, from the first gate 31 to the second gate 32 as the temporary target gate. The actual gate temporarily remains at the temporary target gate for a predetermined period of time. In this case, the lock ball 42 is engaged with one of the grooves of the engaged portion 50 that corresponds to the position at which the actual gate is temporarily located. As illustrated in FIG. 4(C), in a further activation of the select actuator 8 after the predetermined period of time, the actual gate is moved in the select direction, i.e., in a direction denoted with an arrow X3, from the second gate 32 as the temporary target gate to the third gate 33 as the target gate.

As described above, in order to skip at least a single gate for the shift operation, the actual gate temporarily remains at the temporary target gate (i.e., the second gate 32) for the predetermined period of time. The actual gate is further moved to the target gate (i.e., the third gate 33). This method of skipping at least one single gate and moving to the target gate is referred to as a temporary target gate remaining process. Compared with the select operation, in which the actual gate is moved from the first gate 31 directly to the third gate 33 as the target gate, as illustrated in FIG. 4(A), according to the embodiment of the present invention, the actual gate can be prevented from sudden movement, thereby restraining some defects such as overshooting even under a fluctuation of the coefficient of dynamic friction. Therefore, undesired noise due to some defects such as overshooting can be effectively restrained.

Figure 5:
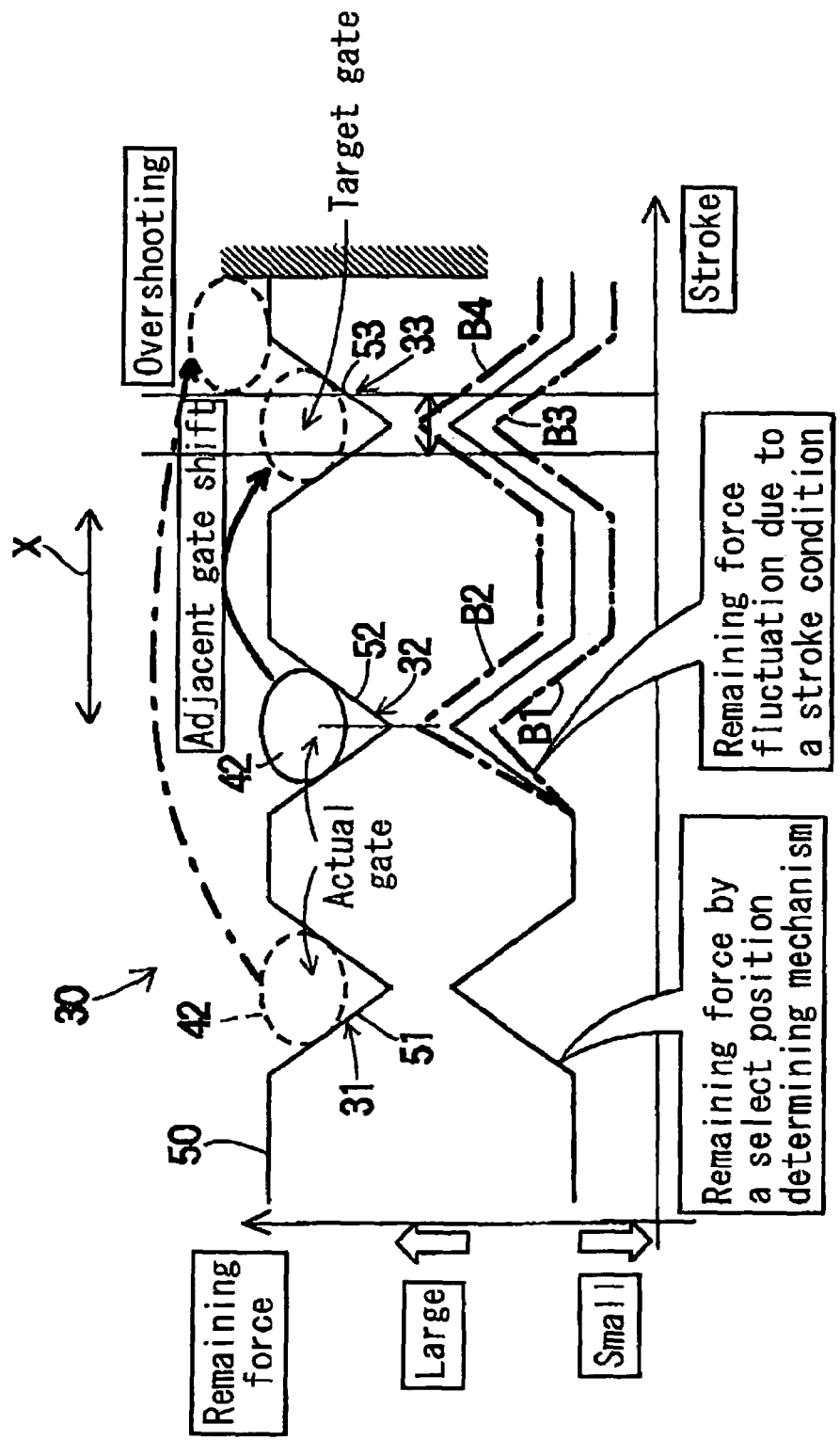
FIG. 5 illustrates an engagement relationship between a lock ball and an engaged portion of the select position determining mechanism according to the first embodiment of the present invention.

As illustrated in FIG. 5, the lock ball 42 is schematically illustrated to have an approximately oval ball shape. However, the lock ball 42 actually has a substantially spherical shape. As described above, the second gate 32 represents the temporary target gate, which is different from the third gate 33 as the target gate and is positioned at the near side of the gate mechanism 30 relative to the third gate 33. In response to the activation of the select actuator 8, a relative movement between the lock ball 42 and the engaged portion 50 is performed. That is, the engagement between the lock ball 42 and the first groove 51 of the first gate 31 is shifted to the engagement between the lock ball 42 and the second groove 52 of the second gate 32.

The lock ball 42 is temporarily seated at the temporary target gate, i.e., at the second groove 52 of the second gate 32, for the predetermined period of time. The select actuator 8 is further activated after the predetermined period of time. The lock ball 42 is then further moved from the temporary target gate (the second groove 52 of the second gate 32) to the target gate (the third groove 53 of the third gate 33). According to the embodiment of the present invention, the engaged portion 50 is moved relative to the lock ball 42 in the select direction, i.e., in the direction denoted with the arrow X. Alternatively, the invention can be applied to a mechanism in which the lock ball 42 is moved relative to the engaged portion 50 in the select direction.

As described above, according to the temporary target gate remaining process of the embodiment of the present invention, some defects such as overshooting can be effectively restrained compared with the movement from the actual gate directly to the target gate. Further, impact between the lock ball 42 and a wall due to overshooting can be effectively prevented, thereby reducing undesired noise.

The vertical axis of FIG. 5 represents an engagement force or a holding force between the lock ball 42 and the engaged portion 50, i.e., a remaining force of the actual gate at the temporary target gate. Generally speaking, the remaining force of the actual gate (the lock ball 42) is increased in response to an increase of the engagement force between the lock ball 42 and each of the first groove 51, the second groove 52, and the third groove 53. As illustrated with lines B1, B2, B3, and B4 in FIG. 5, the remaining force of the lock ball 42 fluctuates due to fluctuation of the coefficient of dynamic friction that occurs in response to the stroke condition.

However, according to the embodiment of the present invention, the lock ball 42 is settled at the temporary target gate, i.e., at the second groove 52 of the second gate 32, for the predetermined period of time. Therefore, fluctuation of the remaining force can be effectively absorbed or reduced. The lock ball 42 is then moved to the target gate after reducing the fluctuation of the remaining force, thereby further restraining overshooting. During the temporary target gate remaining process, when the CPU judges that the lock ball 42 has remained a sufficient time, the CPU compares the temporary target gate with the target gate. The shift operation can be allowed when a corresponding condition between the temporary target gate and the target gate is satisfied. Therefore, according to the embodiment of the present invention, the shift operation can be properly performed. As described above, the shift operation can be performed by activating the shift actuator 9.

Figure 6A:
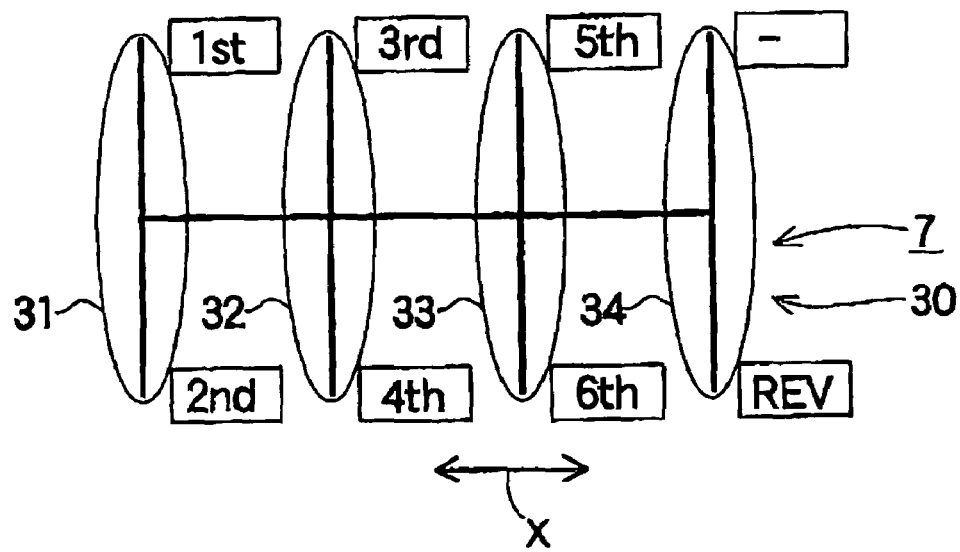
FIG. 6(A) illustrates a four-gate type gate mechanism according to a second embodiment of the present invention.

As illustrated in FIGS. 6(A) and 6 (B), according to a second embodiment of the present invention, the control system for the transmission 2 is provided with the select position determining mechanism 7 with a four-gate type gate mechanism 30. The remaining structure, apart from the gate mechanism 30 according to the second embodiment, is substantially the same as the first embodiment. Therefore, the description thereof will be omitted hereinbelow.

The gate mechanism 30 according to the second embodiment includes the first gate 31 defining the first shift stage and the second shift stage, the second gate 32 defining the third shift stage and the fourth shift stage, a third gate 33 defining the fifth shift stag and a sixth shift stage, and a fourth gate 34 defining a reverse shift stage. The first gate 31, the second gate 32, the third gate 33, and the fourth gate 34 are arranged in parallel along the select direction, i.e., in the direction denoted with an arrow X in FIG. 6(A). When the shift stage is shifted from one of the first and second shift stages at the first gate 31 to the fourth gate 34 as the target gate, at least two gates (the second gate 32 and the third gate 33) are skipped and the actual gate is actually moved to the target gate.

Figure 6B:
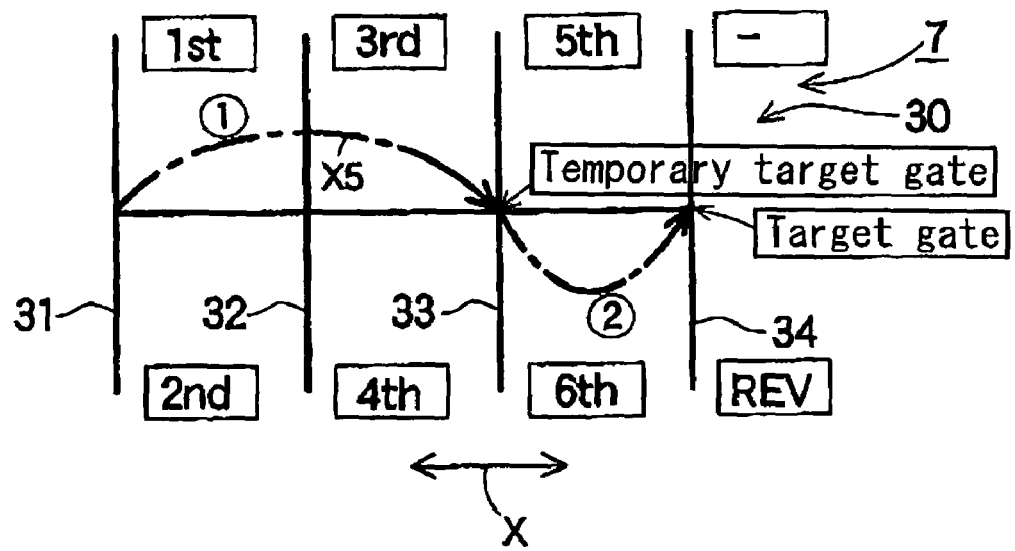
FIG. 6(B) illustrates the four-gate type gate mechanism in which an example of select operations according to the second embodiment of the present invention is performed.

When the two gates are skipped as described above, the actual gate is moved so suddenly. Therefore, it may easily cause some defects such as overshooting. However, according to the second embodiment of the present invention, as illustrated in FIG. 6(B), the third gate 33 represents the temporary target gate, which is different from the fourth gate 34 as the target gate. The temporary target gate (the third gate 33) is defined between the actual gate (the first gate 31) and the target gate (the fourth gate 34). Further, the temporary target gate is defined at the near side of the gate mechanism 30 relative to the target gate. In response to the activation of the select actuator 8, the actual gate is relatively moved in a direction denoted with an arrow X5, i.e., in the select direction, from the first gate 31 to the temporary target gate at the third gate 33. After the actual gate has temporarily remained at the temporary target gate at the third gate 33 for the predetermined period of time, the actual gate is relatively moved from the temporary target gate at the third gate 33 to the target gate at the fourth gate 34.

As described above, compared with the movement from the actual gate at the first gate 31 directly to the target gate at the fourth gate 34, the select operation according to the second embodiment of the present invention can effectively restrain some defects such as overshooting. Therefore, an impact between the lock ball 42 and a wall due to overshooting can be effectively restrained, thereby preventing undesired noise due to the impact.

Figure 7:
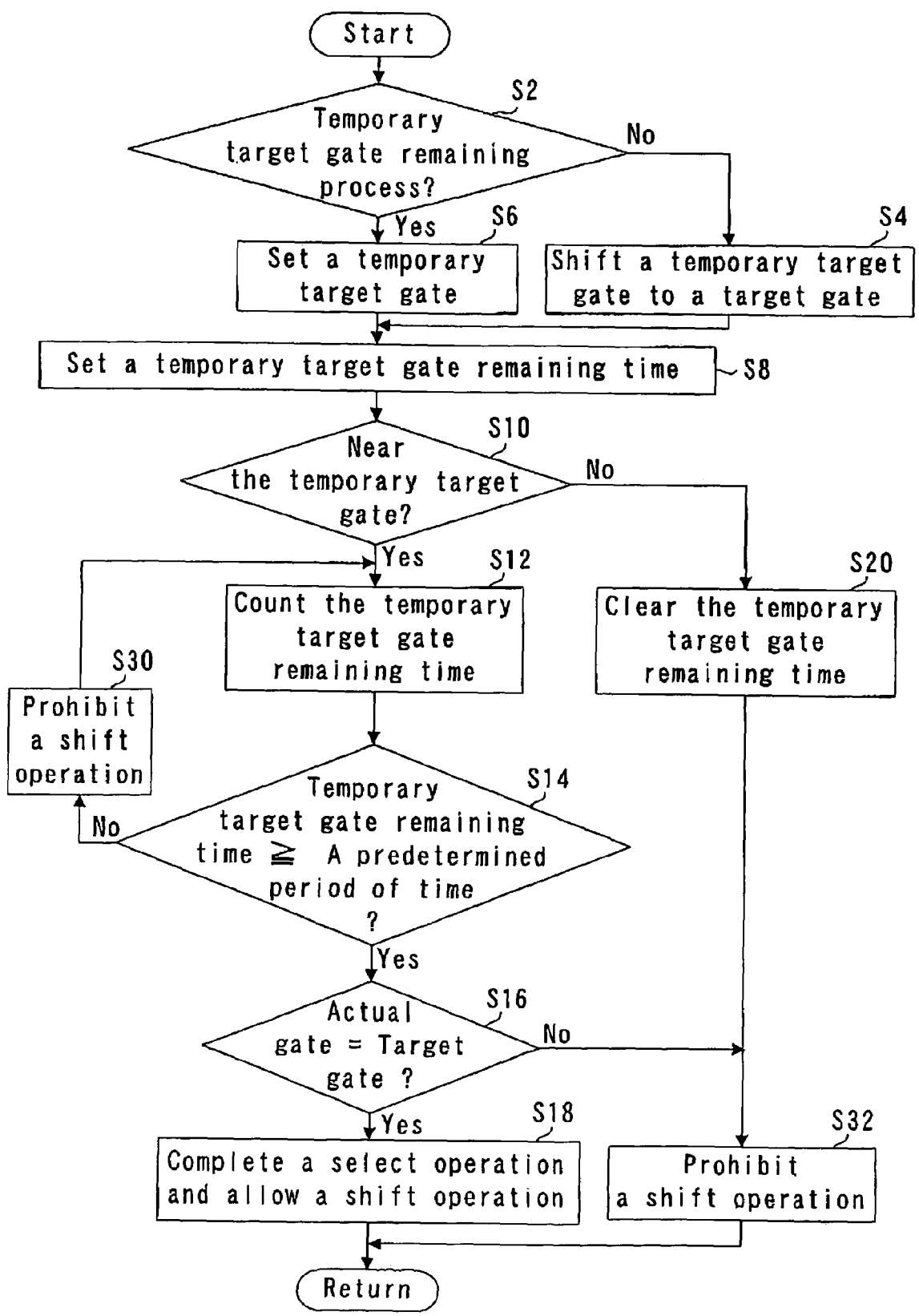
FIG. 7 is a flowchart for explaining a shift operation according to the embodiments of the present invention.

Next, the following explanation will be given for describing an example of a method of performing a shift operation according to the embodiments of the present invention. However, the present invention is not limited only to the below-described method and can be applied to any other methods within claim scopes. With reference to FIG. 7, the CPU judges at step S2 whether the temporary target gate remaining process according to the embodiments of the present invention should be performed. The temporary target gate remaining process is preferably performed when a time period required for the shift operation needs to be shortened, such as when at least one of the accelerator opening degree, the vehicle speed, the engine rotational speed, and the throttle opening degree is relatively high. Therefore, the responsiveness of the shift operation can be improved. When a negative answer "No" is obtained at step S2, the program proceeds to step S4, in which the temporary target gate is set at a gate which is the same as the target gate. In this case, the actual gate is moved directly to the target gate.

When an affirmative answer "Yes" is obtained at step S2, the program proceeds to step S6, in which the temporary target gate is defined at a gate between the actual gate and the target gate. That is, at step S6, the CPU determines a gate skip allowable amount W to skip from the actual gate to the temporary target gate. The allowable amount W is determined to set the temporary target gate between the actual gate and the target gate. Further, the allowable amount W is determined to set the temporary target gate at a near side of the gate mechanism 30 relative to the target gate.

More particularly, when the three-gate type gear mechanism 30 as illustrated in FIGS. 4(B) and 4 (C) is related to the select position determining mechanism 7, the temporary target gate can be set at an intermediate gate, i.e., the second gate 32, which is adjacent to the third gate 33 as the target gate and positioned at the near side of the gate mechanism 30 relative to the target gate. When the four-gate type gear mechanism as illustrated in FIGS. 6 (A) and 6 (B) is related to the select position determining mechanism 7, the temporary target gate can be set at an intermediate gate, i.e., the second gate 32, which is adjacent to the first gate 31 as the actual gate and positioned at the near side of the gate mechanism 30 relative to the fourth gate 34 as the target gate. Alternatively, the temporary target gate can be set at an intermediate gate, i.e., the third gate 33, which is adjacent to the fourth gate 34 as the target gate and positioned at the near side of the gate mechanism 30 relative to the fourth gate 34. Accordingly, in response to the activation of the select actuator 8, the actual gate can be relatively moved to the temporary target gate as set above.

Returning back to the flowchart illustrated in FIG. 7, the CPU determines at step S8 a time required for settling the actual gate at the temporary target gate (hereinafter, referred to as a temporary target gate remaining time). The temporary target gate remaining time represents a time while the actual gate should remain at the temporary target gate. The temporary target gate remaining time is determined based upon the vehicle driving condition. Therefore, when the vehicle driving power source such as the electric motor and the internal combustion engine generates relatively high driving power, the temporary target gate remaining time is set to be relatively short. On the other hand, when the vehicle driving power source generates relatively low driving power, the temporary target gate remaining time is set to be relatively long. More particularly, the vehicle driving condition is determined based upon at least one of the accelerator opening degree, the vehicle speed, the engine rotational speed, the throttle opening degree, the motor rotational speed, and the shift stage in the transmission 2. The temporary target gate remaining time is set in response to the vehicle driving condition. The temporary target gate remaining time varies depending on the vehicle type, the accelerator opening degree, the vehicle speed and so on. However, generally speaking, the temporary target gate remaining time is set within a range from 5 milliseconds to 200 milliseconds, especially within a range from 20 milliseconds to 40 milliseconds, as non-limiting examples.

At step S10, the CPU judges whether the current position of the actual gate is at or near the temporary target gate. The current position of the actual gate in the select direction is detected based upon the signal from the select stroke sensor 13. When a negative answer "No" is obtained at step S10, the actual gate is not located at or near the temporary target gate. Therefore, the program proceeds to step S20 so as to clear the temporary target gate remaining time at zero. The program then proceeds to step S32 so as to output a signal which denotes the select operation has not been completed yet, and a signal, which prohibits the shift operation. Therefore, step S32 functions as a shift operation prohibiting element when the actual gate has not located at or near the temporary target gate.

When an affirmative answer "Yes" is obtained at step S10, the program proceeds to step S12 so as to count the temporary target gate remaining time. At step S14, the CPU judges whether a predetermined time has passed since counting the temporary target gate remaining time. When a negative answer "No" is obtained at step S14, i.e., when the predetermined time has not passed since counting the temporary target gate remaining time, the program proceeds to step S30 so as to output the signal, which denotes the select operation has not been completed yet, and the signal which prohibits the shift operation. The program then returns to step S12 to continue counting the temporary target gate remaining time. Therefore, step S30 functions as the shift operation prohibiting element when the temporary target gate remaining time has not sufficiently passed.

When an affirmative answer "Yes" is obtained at step S14, i.e., when the predetermined time has passed since counting the temporary target gate remaining time, the CPU recognizes that the actual gate has sufficiently been seated at the temporary target gate. Therefore, the program proceeds to step S16 to compare the actual gate with the target gate.

At step S16, when the corresponding condition between the temporary target gate and the target gate is not satisfied, i.e., when the actual gate does not correspond with the target gate, the CPU judges that the actual gate has reached the temporary target gate, and yet has not reached the target gate. Therefore, the program proceeds to step S32 so as to output the signal denoting the incompleteness of the select operation and the signal for prohibiting the shift operation. In this case, although the actual gate has not reached the target gate, the actual gate position has reached to the temporary target gate. More particularly, the actual gate may have reached to a portion at a nearside of the target gate. The program hence returns to step S2 and to step S4, wherein the actual gate is to be shifted to the target gate. As described above, step S32 functions as the shift operation prohibiting element when the actual gate has reached the temporary target gate and yet has not reached the target gate.

On the other hand, when the corresponding condition between the temporary target gate and the target gate is satisfied, i.e., when the actual gate corresponds with the target gate, the CPU judges that the actual gate has reached the target gate. In this case, the program proceeds to step S18 so as to output a signal for completing the select operation and a signal for allowing the shift operation. Steps S2 to S18 thus correspond to an example of a select control means for controlling movement of the select position determining mechanism. Accordingly, the shift operation can be effectively performed in response to the activation of the shift actuator 9.

As described above, according to the embodiment of the present invention, step S8 functions as a setting element for setting the temporary target gate remaining time in response to the vehicle driving condition upon the shift operation. The vehicle driving condition is determined based upon at least one of the accelerator opening degree, the vehicle speed, the throttle opening degree, the engine rotational speed, and the motor rotational speed. Steps 10, 12, and 14 function as temporary target gate remaining judging means for judging that the actual gate has remained at or near the temporary target gate for the predetermined period of time. Steps 16 and 18 function as shift operation allowing means for allowing the shift operation when the corresponding condition between the temporary target gate and the target gate is satisfied by comparing the actual gate and the target gate. Therefore, the shift operation can be effectively performed.

Figure 8:
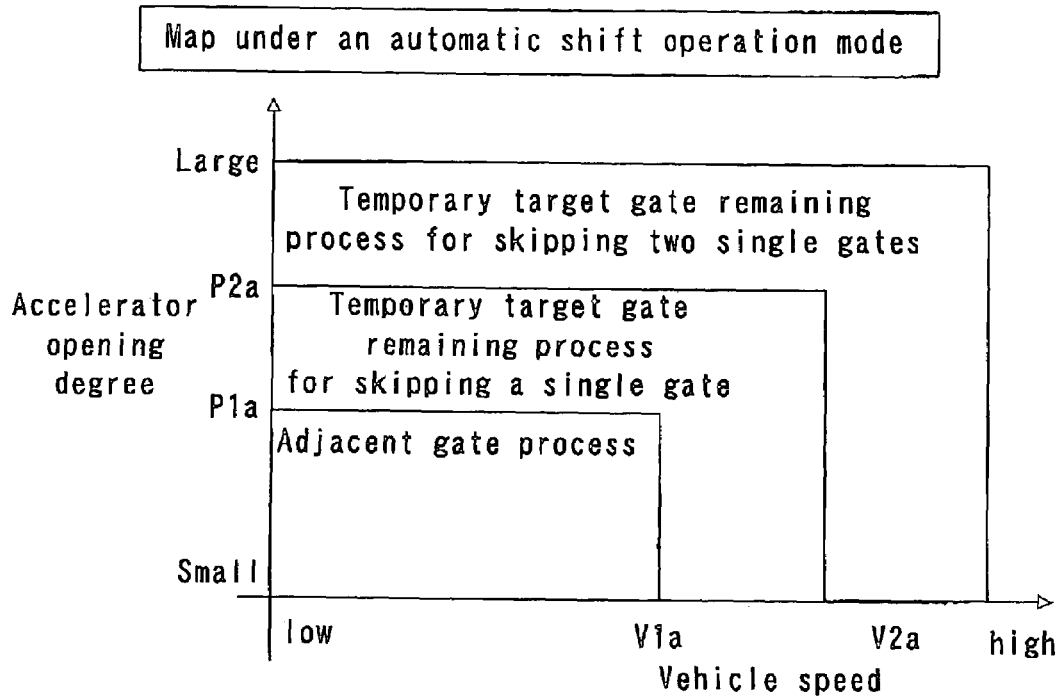
FIG. 8 is an example of maps for judging whether a temporary target gate remaining process is subjected to be performed during an automatic shift operation mode.
Figure 9:
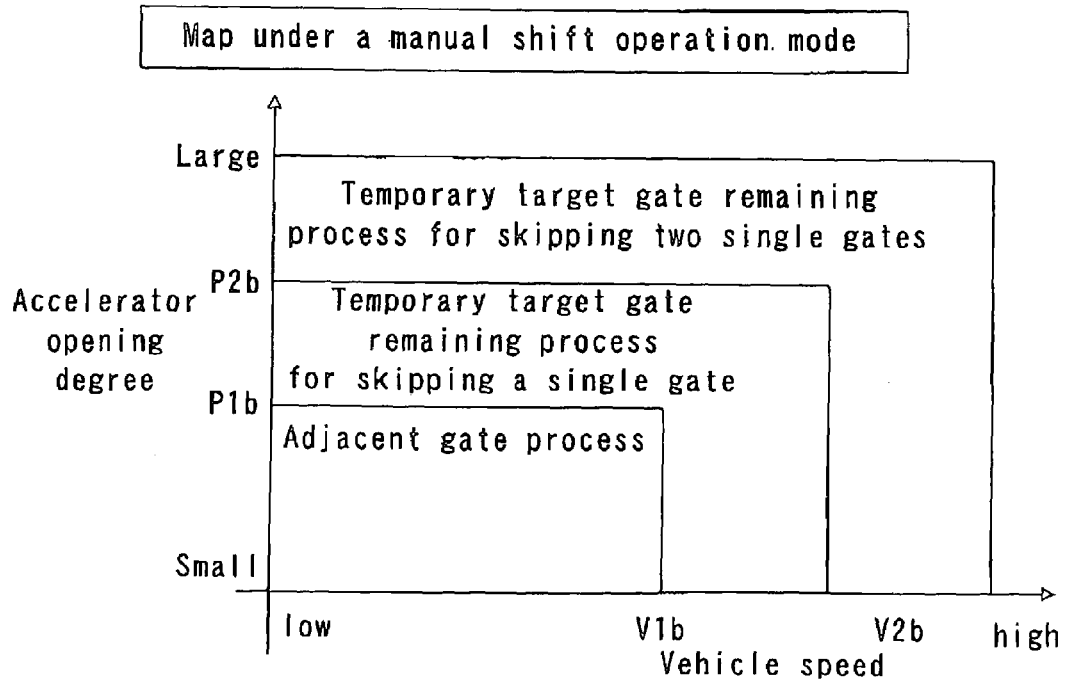
FIG. 9 is an example of maps for judging whether the temporary target gate remaining process are subjected to be performed during a manual shift operation mode.
Figure 10:
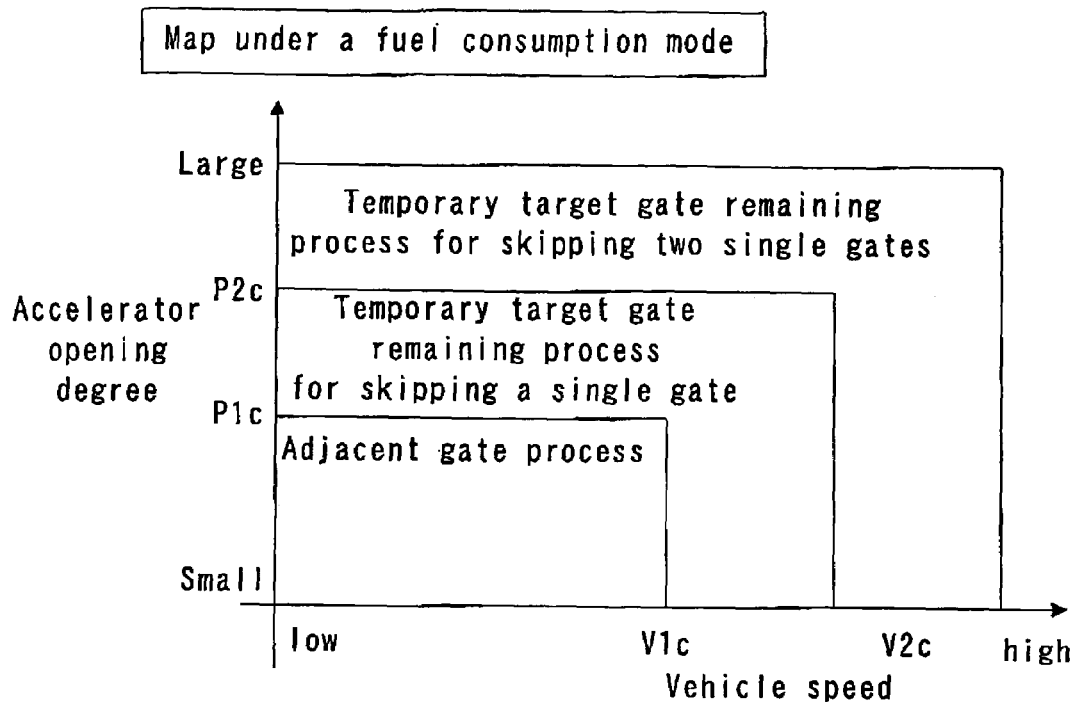
FIG. 10 is an example of maps for judging whether the temporary target gate remaining process are subjected to be performed during a fuel consumption mode.

According to the embodiments of the present invention, whether the temporary target gate remaining process should be performed or not can be judged in accordance with a predetermined map based upon the vehicle driving condition. The map has been stored in a predetermined memory area mounted in the ECU 6. The Examples of the maps illustrated in FIGS. 8–10 are designed for the four-gate type gate mechanism 30, respectively. As illustrated in FIGS. 8–10, when the accelerator opening degree is relatively large and the vehicle speed is relatively high, the temporary target gate remaining process, in which two gates are skipped, is performed. Further, when the vehicle speed is relatively low and yet the accelerator opening degree is relatively large, the temporary target gate remaining process, in which two gates are skipped, is still performed. Still further, when the accelerator opening degree is relatively small and yet the vehicle speed is relatively high, the temporary target gate remaining process, in which two gates are skipped, is still performed.

On the other hand, when the accelerator opening degree is relatively small and the vehicle speed is relatively low, an adjacent gate process, in which the actual gate is shifted to an adjacent gate, is performed. Further, when the accelerator opening degree is relatively intermediate and the vehicle speed is relatively intermediate, the temporary target gate remaining process, in which a single gate is skipped, is performed.

Upon the temporary target gate remaining process for skipping the two gates, the actual gate is relatively moved in a direction of the target gate in the select direction, skipping two gates defined between the actual gate and the target gate. Upon the temporary target gate remaining process for skipping the single gate, the actual gate is relatively moved in the direction of the target gate in the select direction, skipping a single gate defined between the actual gate and the target gate. Upon the adjacent gate process, the actual gate is relatively moved to a gate adjacent to the actual gate along the select direction.

With reference to the map in FIG. 8, the accelerator opening degree during the automatic shift operation mode is represented with threshold values $P1a$ and $P2a$. The vehicle speed during this mode is represented with threshold values $V1a$ and $V2a$. These threshold values $P1a$, $P2a$, $V1a$, and $V2a$ are determined depending on the vehicle driving conditions. The threshold value $P1a$ for the accelerator opening degree and the threshold value $V1a$ for the vehicle speed are referred to in order to determine which process is to be applied, the adjacent gate process or the temporary target gate remaining process for skipping a single gate. The threshold value $P2a$ for the accelerator opening degree and the threshold value $V2a$ for the vehicle speed are referred to in order to determine which process is to be applied, the temporary target gate remaining process for skipping a single gate or the temporary target gate remaining process for skipping two gates.

With reference to the map in FIG. 9, the accelerator opening degree during the other mode such as the manual shift operation mode is represented with threshold values $P1b$ and $P2b$. The vehicle speed during this mode is represented with threshold values $V1b$ and $V2b$. These threshold values $P1b$, $P2b$, $V1b$, and $V2b$ are determined depending on the vehicle driving conditions.

With reference to the map in FIG. 10, the accelerator opening degree during the other mode such as the fuel consumption mode is represented with threshold values $P1c$ and $P2c$. The vehicle speed during this mode is represented with threshold values $V1c$ and $V2c$. These threshold values $P1c$, $P2c$, $V1c$, and $V2c$ are determined depending on the vehicle driving conditions.

Figure 11:
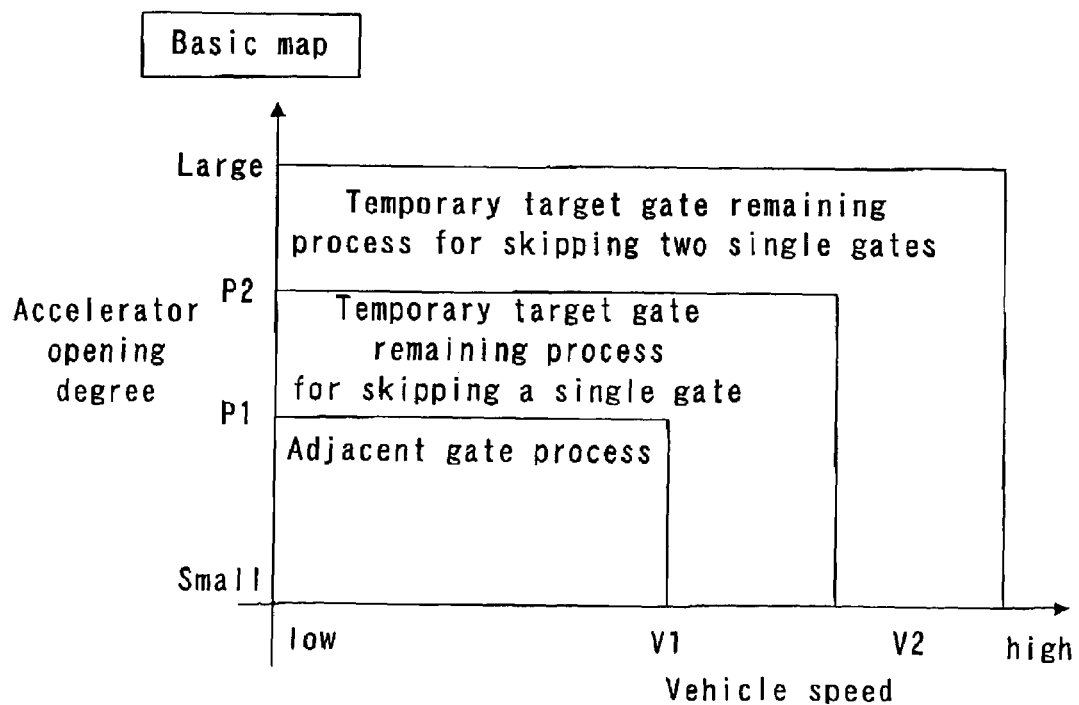
FIG. 11 is an example of maps for determining threshold values for the temporary target gate remaining process in accordance with calculation.

Alternatively, the CPU can judge whether the temporary target gate remaining process is to be applied or not, not only based upon the map as described above but also based upon a map and some calculations. According to a map illustrated in FIG. 11, the accelerator opening degree is represented by threshold values P1 and P2. The vehicle speed is represented by threshold values V1 and V2. These threshold values P1, P2, V1, and V2 are determined depending on the vehicle driving conditions. As described below, respective actual calculated threshold values can be obtained by multiplying the respective above threshold values by coefficients corresponding to the vehicle driving condition, i.e., corresponding to at least one of the accelerator opening degree, the vehicle speed, the throttle opening degree, the engine rotational speed, the motor rotational speed, and the like:

Calculated threshold value=Accelerator opening degree threshold value P1 on the map 11×Coefficient $\alpha 1$ corresponding to the vehicle driving condition;

Calculated threshold value=Accelerator opening degree threshold value P2 on the map 11×Coefficient $\alpha 2$ corresponding to the vehicle driving condition;

Calculated threshold value=Vehicle speed threshold value V1 on the map 11×Coefficient β 1 corresponding to the vehicle driving condition; and Calculated threshold value=Vehicle speed threshold value V2 on the map 11×Coefficient β 2 corresponding to the vehicle driving condition.

When an output parameter concerning the vehicle driving condition is relatively large, either the temporary target gate remaining process for skipping a single gate or the temporary target gate remaining process for skipping two gates can be performed.

According to the above-described embodiment, the select position determining mechanism 7 has the three-gate type gate mechanism 30 (shown in FIG. 4) or the four-gate type gate mechanism 30 (shown in FIG. 6). Alternatively, the gate mechanism 30 can be any type such as a five-gate type gate mechanism as far as the mechanism has plural gates.

According to the above-described embodiment, the engaged portion 50 supported by the shift and select shaft 46 is moved relative to the lock ball 42 in response to the movement of the shift and select shaft 46. Alternatively, the lock ball 42 can be moved relative to the engaged portion 50.

The principles, embodiments and modes of operation of the present invention have been described in the foregoing specification and drawings. However, the invention which is intended to be protected is not to be construed as limited to the particular embodiments disclosed. Further, the embodiments described herein are to be regarded as illustrative rather than restrictive. Plural objectives are achieved by the present invention, and yet there is usefulness in the present invention as far as one of the objectives are achieved. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A select control system for a vehicle transmission comprising:
   a gate mechanism having plural gates, the respective plural gates being selected upon a shift operation;
   a select position determining mechanism adapted to move along a select direction of the gate mechanism; and
   select control means for controlling movement of the select position determining mechanism during the shift operation by performing a temporary target gate remaining process in which an actual gate temporarily remains at an temporary target gate and moves to a target gate,
   wherein the temporary target gate is between the actual gate and the target gate, and wherein at least one gate is skipped while the actual gate is moved to the target gate.

2. A select control system for a vehicle transmission according to claim 1, wherein the select control means performs the temporary target gate remaining process in response to a detected vehicle driving condition upon the shift operation.

3. A select control system for a vehicle transmission according to claim 2, wherein the select control means performs the temporary target gate remaining process when an output parameter related to a vehicle driving output is large.

4. A select control system for a vehicle transmission according to claim 3, wherein the vehicle driving output is large when at least one of an accelerating opening degree, a throttle opening degree, a vehicle speed, an engine rotational speed, and a motor rotational speed is larger than a predetermined value.

5. A select control system for a vehicle transmission according to claim 1, wherein the select control means includes:
   temporary target gate remaining judging means for judging that the actual gate has remained at the temporary target gate when the actual gate is judged to have remained at the temporary target gate for a predetermined period of time; and
   shift operation allowing means for allowing the shift operation when a corresponding condition between the temporary target gate and the target gate is satisfied when the actual gate is judged to have remained at the temporary target gate.

6. A select control system for a vehicle transmission according to claim 5, wherein, the select control means determines the predetermined period of time in response to the vehicle driving condition upon the shift operation.

7. A select control system for a vehicle transmission according to claim 6, wherein the select position determining mechanism includes:
   a base portion;
   an engaged portion configured to be engaged with the base portion; and
   an actuator adapted to move at least one of the base portion and the engaged portion.

8. A method of performing a shift operation for a vehicle, comprising the steps of:
   determining a temporary target gate;
   determining a temporary target gate remaining time;
   judging whether an actual gate is at the temporary target gate;
   counting the temporary target gate remaining time when the actual gate is judged to be at the temporary target gate;
   judging whether the temporary target gate remaining time is more than a predetermined period of time;
   judging that a corresponding condition between the temporary target gate and the target gate has been satisfied when the temporary target gate remaining time is judged to be more than the predetermined period of time;
   completing a select operation; and
   performing a shift operation when the corresponding condition has been satisfied.

9. A method of performing a shift operation according to claim 8, further comprising the step of:
   prohibiting the shift operation when the temporary target gate remaining time is judged to be less than the predetermined period of time.

10. A method of performing a shift operation according to claim 9, wherein the shift operation prohibition step is performed when the corresponding condition between the temporary target gate and the target gate has not been satisfied.

11. A method of performing a shift operation according to claim 8, wherein the vehicle has the manual transmission including a gate mechanism comprising the actual gate currently being selected, the target gate, and the temporary target gate between the actual gate and the target gate, wherein the temporary target gate is determined when a vehicle driving force output is large.

12. A method of performing a shift operation according to claim 8, wherein the temporary target gate remaining time is determined depending on a vehicle driving condition.

13. A select control system for a vehicle transmission in a vehicle having a vehicle driving power source and a transmitting path for transmitting a driving power from the vehicle driving power source, comprising:
a gate mechanism having plural gates for defining vehicle shift stages;
means for determining a select position to be established in the transmission;
means for operating the means for determining the select position; and
controlling means for controlling the means for operating the means for determining the select position such that an actual gate temporarily remains at a temporary target gate between the actual gate and a target gate before the actual gate reaches the target gate,
wherein the temporary target gate is between the actual gate and the target gate, and wherein at least one gate is skipped while the actual gate is moved to the target gate.

14. A select control system for a vehicle transmission according to claim 13, wherein the means for determining the select position to be established in the transmission includes a base portion supported by the transmission, an engaged portion selectively engaged with the base portion, and a shift and select shaft adapted to support the engaged portion.

15. A select control system for a vehicle transmission according to claim 14, wherein at least one of the base portion and the engaged portion is relatively movable in response to a select movement of the shift and select shaft operated by the means for operating the means for determining the select position.

16. A select control system for a vehicle transmission according to claim 15, wherein the base portion includes a ball portion, the engaged portion has at least a first groove, a second groove, and a third groove, each of which is selectively engagable with the ball portion, wherein the ball portion temporarily remains at the second groove before the ball portion is moved from the first groove to the third groove.

17. A select control system for a vehicle transmission according to claim 15, wherein the base portion includes a ball portion, the engaged portion has at least a first groove, a second groove, a third groove, and a fourth groove, each of which is selectively engagable with the ball portion, wherein the ball portion temporarily remains at least one of the second and third grooves before the ball portion is moved from the first groove to the fourth groove.

* * * * *